Figure 4:
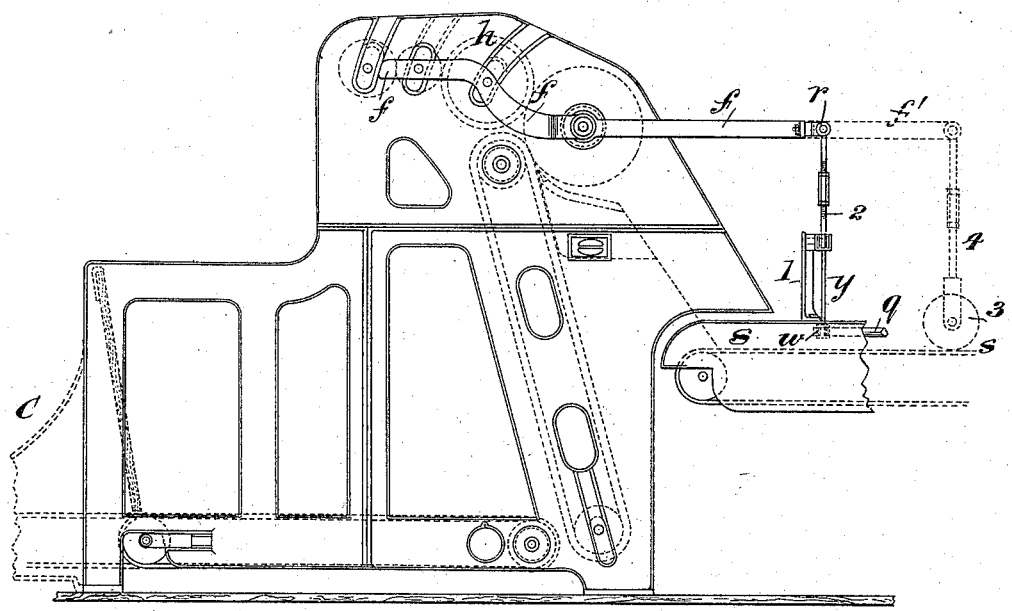

No. 612,566. Patented Oct. 18, 1898.
T. R. MARSDEN.
FEEDING MACHINE FOR CARDING MACHINES.
(Application filed Sept. 28, 1897.)
(No Model.) 2 Sheets—Sheet 1.
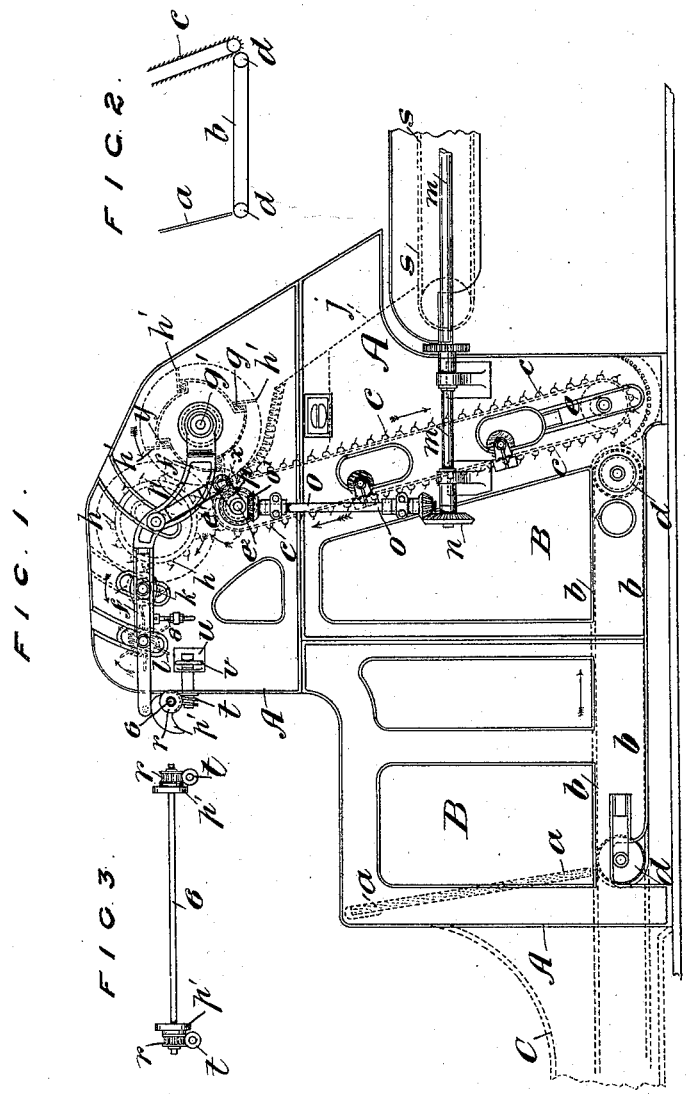
Witnesses
Inventor
Thomas Rodgerson Marsden,
By his atty No. 612,566. Patented Oct. 18, 1898.
T. R. MARSDEN.
FEEDING MACHINE FOR CARDING MACHINES.
(Application filed Sept. 28, 1897.)
(No Model.) 2 Sheets—Sheet 2.

Witnesses
Inventor
Thomas Rodgerson Marsden
By his Atty

UNITED STATES PATENT OFFICE.

THOMAS RODGERSON MARSDEN, OF OLDHAM, ENGLAND.

FEEDING-MACHINE FOR CARDING-MACHINES.

SPECIFICATION forming part of Letters Patent No. 612,566, dated October 18, 1898.

Application filed September 28, 1897. Serial No. 653,394. (No model.) Patented in England May 24, 1893, No. 10,254.

*To all whom it may concern:*

Be it known that I, THOMAS RODGERSON MARSDEN, a subject of the Queen of England, and a resident of Oldham, Lancaster county, England, have invented certain new and useful Improvements in Feeding-Machines for Cotton and Fibrous Material, (patented in Great Britain, No. 10,254, May 24, 1893,) of which the following is a specification.

The object of my invention is to arrange the feeding-machine so that the fiber shall be well opened and delivered in regular quantities onto the feed-lattice of the machine to be fed. I employ the usual hopper, in which I mount an endless traveling lattice and an endless traveling spiked sheet. The endless lattice forming the bottom of the hopper carries the fibrous material against the spiked sheet, which may be placed in a vertical or inclined position. Above the top part of the spiked sheet I place a spiked cylinder, which is carried by a suitable fixing, which is mounted so as to be free to swivel to a slight extent on the shaft forming the center of the stripping-cylinder. The stripping-cylinder, which is provided with blades of leather or other material, is mounted so as to strip the cotton from the spiked sheet, so that it may fall upon the feeder of the opener, scutcher, or carding-machine to be fed. The spiked cylinder is placed so that it can be stripped by the stripping-cylinder which strips the endless spiked sheet. By mounting the spiked roller on its movable support the distance between the teeth of the spiked cylinder and the teeth of the endless spiked sheet can be varied at pleasure, thus enabling the quantity of cotton carried forward by the endless spiked sheet to be regulated. The vertical or inclined spiked sheet carries the fibrous material out of the hopper and up to the spiked cylinder, which, revolving in a contrary direction to the endless spiked sheet, opens the fibrous material carried forward by the spiked sheet on its way to the machine to be fed. The spiked cylinder carries a small quantity of material forward, which is stripped by the stripping-cylinder already referred to as having blades of leather or other material. The stripping-cylinder may also have in addition to the blades of leather spikes or pins. I also employ a stripping-roller to strip lumps of material from the spiked cylinder. The spiked cylinder, which is swiveled on the center of the stripping-cylinder, is raised or lowered by the "regulator" forming part of the machine to be fed, or it may be operated by the rising and falling of a roller resting on the cotton fed on and carried forward by the lattice of the scutcher, opener, or other machine to be fed.

In carrying out my invention I drive the vertical or inclined lattice or spiked sheet from the "regulating-roller" of the machine being fed. In cases where a regulator is not used I may drive the vertical or inclined lattice or spiked sheet from the feed-roller of the machine to be fed. Instead of the spiked cylinder I sometimes use a spiked lattice, which is arranged to be raised and lowered in the same manner and for the same purpose as the spiked cylinder.

To render my invention clearly understood, I will now proceed to describe the same in detail, reference being had to the annexed two sheets of illustrative drawings.

Figure 1, Sheet 1, represents in side elevation the general arrangement of a feeding-machine made in accordance with my invention. The hopper or space for containing the cotton to be fed is situated between the sides A of the machine and is indicated by B. The board *a* forms the front of the hopper, the traveling lattice *b*, moving in the direction of the arrows, forms the floor of the hopper, and the spiked sheet *c*, traveling in the indicated direction, constitutes the back of the hopper. The spiked sheet *c* may be arranged either vertically or at an angle. In practice I have found it is more advantageous to have it in an inclined position. I therefore arrange the spiked sheet *c* with a forward rake or inclination, as shown in Fig. 1 and as more clearly indicated by the diagram Fig. 2. In some cases I dispense with the hopper-front *a* and extend the lattice *b* to any required distance, the cotton or textile fiber being carried by the lattice up to the spiked sheet. This extension of the lattice *b* might be inclosed on either side by fences C. (Shown in dotted lines in Figs. 1 and 4.) This arrangement would prove convenient in certain situations where the cotton would otherwise have to be carried some distance before being placed in the hopper.

By the forward inclination or rake of the spiked sheet $c$ the tendency to variation of feed existing under the different conditions of a nearly empty and a full hopper is greatly reduced.

The endless traveling lattice $b$ is supported on pulleys $d\ d$ and, forming the bottom of the hopper, carries the cotton or other fibrous material in the hopper against the spiked sheet $c$, carried on pulleys $e\ e'$, the said spiked sheet being raked or inclined forward for the indicated reasons. At the upper end of the spiked sheet $c$ I place a spiked cylinder $h$, (revolving in the direction of the arrows,) the bearings of which are carried in side levers $f$. The side levers $f$ are pivoted on the shaft $g'$ of the stripping-cylinder $g$, which rotates in the indicated direction and which is so situated as to strip both the spiked cylinder $h$ and the spiked sheet $c$. The periphery of the stripping-cylinder is furnished with blades $h'$, of leather, which beat and strip the fibers from the cylinder $h$ and the spiked sheet $c$, the stripped fiber passing down the chute $j$ to the traveling feed-apron $s$, in connection with the scutcher or opener or other machine to which the fibrous material is being fed.

Behind the cylinder $h$ I place a smaller spiked roller $k$ (revolving as indicated) to remove lumps or irregular portions of fiber from the cylinder $h$. The fiber thus removed from the cylinder $h$ is stripped back into the hopper by a stripping-roller $l$, revolving in the direction of the arrow. The aforesaid parts are driven from a shaft $m$, operated from the regulator.

A bevel-wheel $n$ on the end of the shaft $m$ operates a corresponding bevel-pinion on an upright shaft $o$, and a bevel-wheel $o'$ on the shaft $o$ drives a wheel on the end of the shaft $e^2$ of the upper carrying-drum $e'$ of the spiked sheet $c$. Thus the spiked sheet $c$ is operated.

Suitable gearing is placed between the shaft $e^2$ and the shafts of the spiked cylinder $h$ and the stripping-cylinder $g$, so that these shall be driven from the shaft $e^2$. To prevent the toothed wheel of the spiked cylinder $h$ from being lifted out of gear with the wheel on the shaft $e^2$ when the side levers $f$ are moved, so as to increase the distance of the spiked cylinder from the spiked sheet, I place an intermediate wheel $x$ between these two wheels. The intermediate wheel is mounted on toggle-joint links $p$, which keep the intermediate wheel $x$ always in gear with the respective driving and driven wheels, and thus prevent disconnection. Any other suitable means might, however, be adopted to obtain the desired end—viz., that of keeping the three shafts always in driving connection with each other.

The regulation of my improved feeding-machine is effected in two different modes, each mode having its distinctive feature. In the first place when I drive the spiked sheets $c$ from the regulator-shaft $m$, as described, I thereby secure the "evening" or regulating of the feed; but in addition to this I also provide for varying the thickness of the opener-lap. The means for regulating the said thickness consist in arrangements for raising and lowering the spiked cylinder $h$ away from or closer to the spiked sheet $c$. This I do by providing cams $p'$ to support the ends of the side levers $f$. According to the position of the cams $p'$, which are carried on the shaft 6, the side levers, and consequently the spiked rollers $h$, are raised or lowered.

Figure 5:
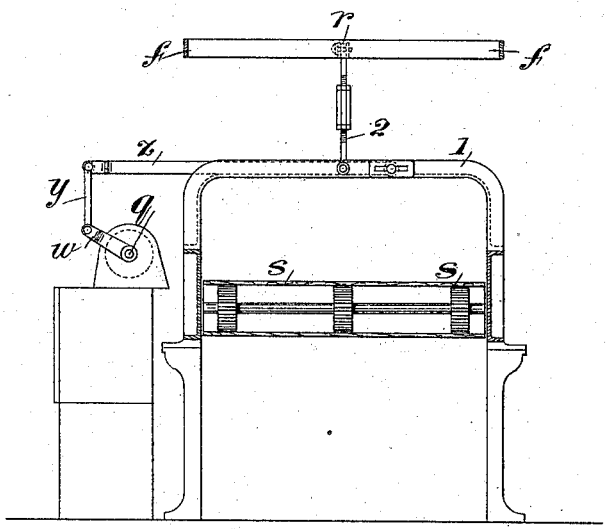

The shaft 6, with the cams $p'$, are shown in side view at Fig. 3. To turn the cams, I arrange a worm-wheel $r$ on the end of the shaft 6, which engages with a worm $t$ on a short shaft carried in a bracket $u$, bolted to the side of the hopper. A hand-wheel $v$ on the end of the short shaft is used to turn the shaft and operate the worm-gearing and so rotate the cams, whereby the side levers $f$ are raised or lowered. The spiked cylinder $h$ can thus be supported or set at any required distance from the spiked sheet $c$, and the amount of fleece passing between the sheet and the roller is regulated, so as to determine the thickness of the opener-lap. Instead of the cams and worm-gearing I might use the simpler means of set-screws 8, which also appear in Fig. 1. In the second instance when the spiked sheet $e$ is driven at a constant velocity from any suitable source I provide for automatic evening or regulating of the fleece, and this I do by raising and lowering the spiked cylinder $h$ automatically through connections operated from the regulator or from a roller resting on the cotton-feed carried forward by the lattice $s$. The means I have designed to carry this into effect are illustrated in Figs. 4 and 5 of the drawings, Sheet 2. I extend the side levers $f$ toward the machine being fed and connect them to a shaft or other part controlled by the regulator or by the aforesaid regulating-roller.

When the side levers are controlled from the regulator, I bring a rock-shaft $q$ from the regulator, this rock-shaft receiving its motion from the belt-fork of the regulator, so as to vibrate up and down to a certain extent. Upon the rock-shaft I fix a lever $w$, (see Fig. 5,) which is connected to a link $y$ by a lever $z$, pivoted on the bridge-bracket 1. An adjustable rod 2 connects the lever $z$ to the cross-bar $f'$ of the side levers $f$. It will thus be seen that the movements of the shaft $q$ will result in moving the side levers $f$, and therefore raise and lower the spiked cylinder $h$, so that the evenness or regularity of the fleece is thereby maintained irrespective of the speed of the spiked sheet $c$. The other mode of automatically governing the spiked roller $h$ from a roller resting on the cotton-feed is shown in dotted lines in Fig. 4. I arrange a roller 3 to rest upon the cotton-feed on the lattice s. This roller is connected by an adjustable rod 4 to the cross-bar f' of the side levers f, as in the former instance.

If the thickness of the cotton-feed on the lattice s should vary, the roller 3 rises or falls and correspondingly moves the side levers f and the spiked roller h. Thus the thickness of the fleece passing between the spiked roller h and the spiked sheet c is regulated by the thickness of the cotton-feed being carried by the lattice s to the scutcher or opener. The auxiliary roller k and the stripper l are also carried by the side levers f, and therefore move in unison with the spiked cylinder h.

The operation of my improved feeding apparatus is as follows: The cotton or other fibrous material is thrown into the hopper B or upon the lattice b, and the traveling lattice b carries against the spiked sheet c, which lifts the cotton to the spiked cylinder h. Here the cotton is broken and opened to a certain extent by the revolving cylinder h, and the quantity of cotton delivered is also regulated by the adjustment of the cylinder h, as hereinbefore described. The bulk of the fiber is carried on by the spiked sheet c to the stripper g, but a portion is also carried around by the cylinder h. Any lumps which may adhere to the cylinder h are broken up by the smaller spiked roller k, and any fiber removed by the roller k is stripped therefrom by the stripper l and returned to the hopper B. The main stripper g acts upon both the spiked cylinder h and the spiked sheet c and strips the cotton into the chute j, down which it slides to the traveling feed-apron s, which conducts the cotton to the scutcher, opener, or other preparing machine with which my improved feed apparatus is being worked.

I claim—

1. In combination, the frame, the hopper, the spiked sheet with operating means therefor to cause the same to act on the material in the hopper, the spiked cylinder acting in conjunction with the spiked sheet, the pivoted frame carrying the said spiked cylinder, means for rotating the spiked cylinder, the stripping-cylinder on the pivot of the frame and acting in conjunction with both the spiked cylinder and the spiked sheet, and means for operating the pivoted lever or frame to move the spiked cylinder in relation to the spiked sheet while maintaining its position relative to the stripping-cylinder, substantially as described.

2. In combination, the frame, the hopper, the spiked sheet with operating means therefor to cause the same to act on the material in the hopper, the spiked cylinder acting in conjunction with the spiked sheet, the pivoted frame carrying the spiked cylinder, means for rotating the spiked cylinder, the stripping-cylinder on the pivot of the frame and acting in conjunction with both the spiked cylinder and the spiked sheet, the supplemental spiked roller and supplemental stripping-roller carried by the said pivoted frame, said supplemental spiked roller acting in connection with the main spiked cylinder, and means for operating the spiked sheet, spiked cylinder and the stripping-cylinder substantially as described.

3. In combination, the spiked sheet, the spiked cylinder, a frame carrying the same, a stripping-cylinder, said frame being pivoted on the axis of the stripping-cylinder, means for adjusting the frame on the axis of the stripping-cylinder and means for operating the spiked sheet, spiked cylinder and stripping-cylinder substantially as described.

4. In combination, the spiked sheet, the stripping-cylinder, the spiked cylinder, the pivoted frame carrying the same, the rock-shaft, the regulator connected thereto, the lever-and-link connection between the rock-shaft and the pivoted frame, and means for operating the stripping-cylinder, the spiked sheet and the spiked cylinder substantially as described.

In witness whereof I have hereunto set my hand in presence of two witnesses.

THOMAS RODGERSON MARSDEN.

Witnesses:
JOSHUA ENTWISLE,
RICHARD IBBERSON.